UNITED STATES PATENT OFFICE.

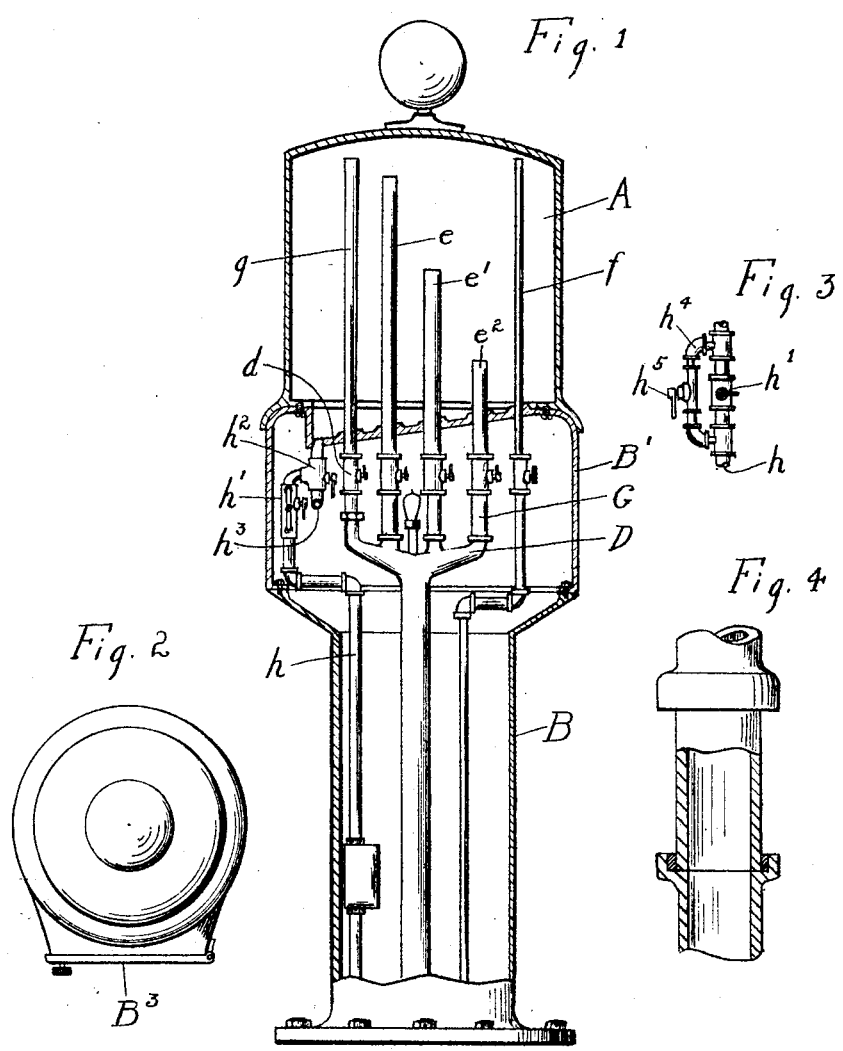

STANLEY J. WHITE, OF CINCINNATI, OHIO, ASSIGNOR OF FORTY-NINE PER CENT TO EDGAR LEVISON, OF CINCINNATI, OHIO.

GASOLINE-MEASURING DEVICE.

1,404,502.     Specification of Letters Patent.     Patented Jan. 24, 1922.

Application filed September 8, 1919. Serial No. 322,245.

*To all whom it may concern:*

Be it known that I, STANLEY J. WHITE, a citizen of the United States of America, and resident of Cincinnati, in the county of Hamilton and State of Ohio, have invented a new and useful Improvement in Gasoline-Measuring Devices, of which the following is a specification.

The object of my invention is a liquid measuring device, particularly intended for vending gasoline, which is simple of construction, accurate in operation and visible to the customer.

This and other objects are attained by the means described in the specification and illustrated in the accompanying drawings, in which:—

Fig. 1, is a central sectional view of a measuring device embodying my invention, parts thereof being shown in side elevation.

Fig. 2, is a plan view of the same.

Fig. 3, is a detail view of the filling pipe.

Fig. 4, is a view partly in section of one of the glass tubes and the means for mounting it between the manifold and the overflow pipe.

Referring to the parts,

My device comprises a tank A which is mounted upon a standard or housing B; a manifold D; overflow pipes $e$, $e'$, $e^2$; air pipe $f$; overflow pipe $g$ and supply pipe $h$. Supply pipe $h$ has located in it two valves $h'$, $h^2$, the former of which regulates the admission of gasoline into the tank A, and the latter of which regulates the discharge of gasoline from the tank through the pipe $h^3$ through which the gasoline may be delivered to the customer. The measuring pipes $e$, $e'$, $e^2$ are of varying heights and are regulated so that their upper edges are flush with the surface of the liquid when the tank contains a certain amount of liquid. As for instance it would take three gallons to fill the tank to the level of pipe $e^2$, five gallons to fill it to the level of pipe $e'$ and seven gallons to fill it to the level of pipe $e$. Pipe $g$ performs the function of a vent pipe. Between the lower ends of the pipes $e$, $e'$, $e^2$ and $g$ are a series of valves $d$ and a series of glass tubes G. The manifold D leads into the gasoline tank not shown. In the supply pipe $h$ is a by-pass $h^4$ which is provided with a cock $h^5$.

The manifold D, the series of glass tubes G and the series of valves $d$, $h'$ and $h^2$ are mounted in an enlargement B' of the casing, the front of which is provided with a door B³ for giving access thereto.

The bottom of the tank A is made slanting and the pipe $h$ enters the lowermost portion thereof so that all the gasoline in the tank may drain therefrom when the valve $h^2$ is opened.

In operation each of the valves $d$, which is in a tube, representative of a smaller amount than that which is to be vended, is closed, the door B³ being thrown open. Then valve $h^2$ being closed the valve $h'$ is opened and gasoline flows into the tank A by employing any suitable means for forcing the gasoline to move in the direction of the tank. As soon as it reaches the level of the pipe, which represents the amount of gasoline to be vended, the gasoline will overflow into said pipe and be seen at the glass tube G, in that pipe, as the gasoline flows back into the manifold D and then into the tank. As the gasoline approaches the level of the pipe in question its further advance may be made more gradual by closing the valve $h'$ and permitting the flow to take place through by-pass $h^4$, the flow through which may be regulated by means of the valve $h^5$. The air pipe $f$ acts as a vent, so that when tank A is being filled the air in the tank will not be compressed and injure the tank. When A is being emptied, the vent will admit air above the liquid so as to avoid a tendency toward a vacuum, thereby making possible the speedy draining of the tank. It is preferable to have the air vent terminate in the supply tank whereby the same air, heavily laden with gasoline vapor is used repeatedly. In view of the high and rapid vaporization of gasoline, the economy herein is self evident.

Having thus described my invention, what I claim is:—

1. In a gasoline measuring device the combination of a tank, an overflow manifold beneath the tank, a series of overflow tubes of varying heights projecting into the tank, a series of glass tubes connecting the overflow pipes and the overflow manifold, cocks regulating the overflow of fluid from the tubes into the overflow manifold, a feed pipe leading into the tank, and a discharge pipe adapted to drain the tank.

2. In a gasoline measuring device the combination of a tank, a gasoline supply reservoir, a housing supporting the tank, an overflow manifold within the housing beneath the bottom of the tank, a supply pipe leading through the housing into the tank, a vent tube adapted to establish communication between the top of the tank and the gasoline supply reservoir, tubes projecting from the overflow manifold through the bottom and terminating at various heights within the tank, cocks regulating communication between the tank and the overflow manifold, and a discharge pipe adapted to drain the tank.

In testimony whereof, I have hereunto subscribed my name this 6th day of September, 1919.

STANLEY J. WHITE.